United States Patent
Sugimoto et al.

(10) Patent No.: US 7,131,741 B2
(45) Date of Patent: *Nov. 7, 2006

(54) AUTOMATIC BEAM-AXIS ADJUSTMENT SYSTEM FOR VEHICULAR HEADLIGHTS

(75) Inventors: Toshio Sugimoto, Okazaki (JP); Kenichi Nishimura, Gifu (JP); Kazuhisa Okumura, Kariya (JP)

(73) Assignee: Denso Corporation, Kariya (JP)

( * ) Notice: Subject to any disclaimer, the term of this patent is extended or adjusted under 35 U.S.C. 154(b) by 151 days.

This patent is subject to a terminal disclaimer.

(21) Appl. No.: 10/463,605

(22) Filed: Jun. 18, 2003

(65) Prior Publication Data

US 2004/0001331 A1    Jan. 1, 2004

(30) Foreign Application Priority Data

Jun. 26, 2002  (JP) .............................. 2002-186224
Apr. 21, 2003  (JP) .............................. 2003-116055

(51) Int. Cl.
*B60Q 1/10* (2006.01)
(52) U.S. Cl. ........................ 362/37; 362/464; 362/465; 362/466
(58) Field of Classification Search ................. 362/37, 362/464, 466, 465, 523, 427, 40, 41; 701/49; 340/468, 475, 476, 477
See application file for complete search history.

(56) References Cited

U.S. PATENT DOCUMENTS

| 5,588,733 A | * | 12/1996 | Gotou ........................ 362/37 |
| 5,660,454 A |   | 8/1997  | Mori et al. |
| 5,711,590 A |   | 1/1998  | Gotoh et al. |
| 6,049,749 A |   | 4/2000  | Kobayashi |
| 6,547,424 B1 | * | 4/2003 | Hasumi et al. ............. 362/465 |
| 6,578,993 B1 | * | 6/2003 | Kobayashi et al. ......... 362/466 |
| 6,671,640 B1 | * | 12/2003 | Okuchi et al. ................ 702/95 |
| 2001/0026451 A1 |   | 10/2001 | Hasumi et al. |
| 2002/0036907 A1 |   | 3/2002  | Kobayashi et al. |
| 2002/0039295 A1 |   | 4/2002  | Kobayashi et al. |
| 2003/0031008 A1 |   | 2/2003  | Kobayashi |

FOREIGN PATENT DOCUMENTS

| JP | A-8-132955    | 5/1996 |
| JP | A-2003-159992 | 6/2003 |

OTHER PUBLICATIONS

Office Communication issued from European Patent Office issued on Nov. 30, 2005 for the corresponding European patent application No. 03 013 987.7-2423 (a copy thereof).

* cited by examiner

Primary Examiner—Thomas M. Sember
(74) Attorney, Agent, or Firm—Posz Law Group, PLC

(57) ABSTRACT

In an automatic beam-axis adjustment system, a beam-axis of a headlight is gradually swivel to a position determined based on a steering angle of a steering wheel. The beam-axis returns to the initial position and a swivel control is inhibited when a vehicle is at a stop or slowly moving in an intersection, regardless of the steering angle. The swivel control is restarted after the vehicle starts running straight ahead. In other words, the swivel control is not restarted until the vehicle stats running straight ahead even when the speed of the vehicle exceeds a predetermined value. Therefore, the movement of the headlights does not disturb a driver.

10 Claims, 9 Drawing Sheets

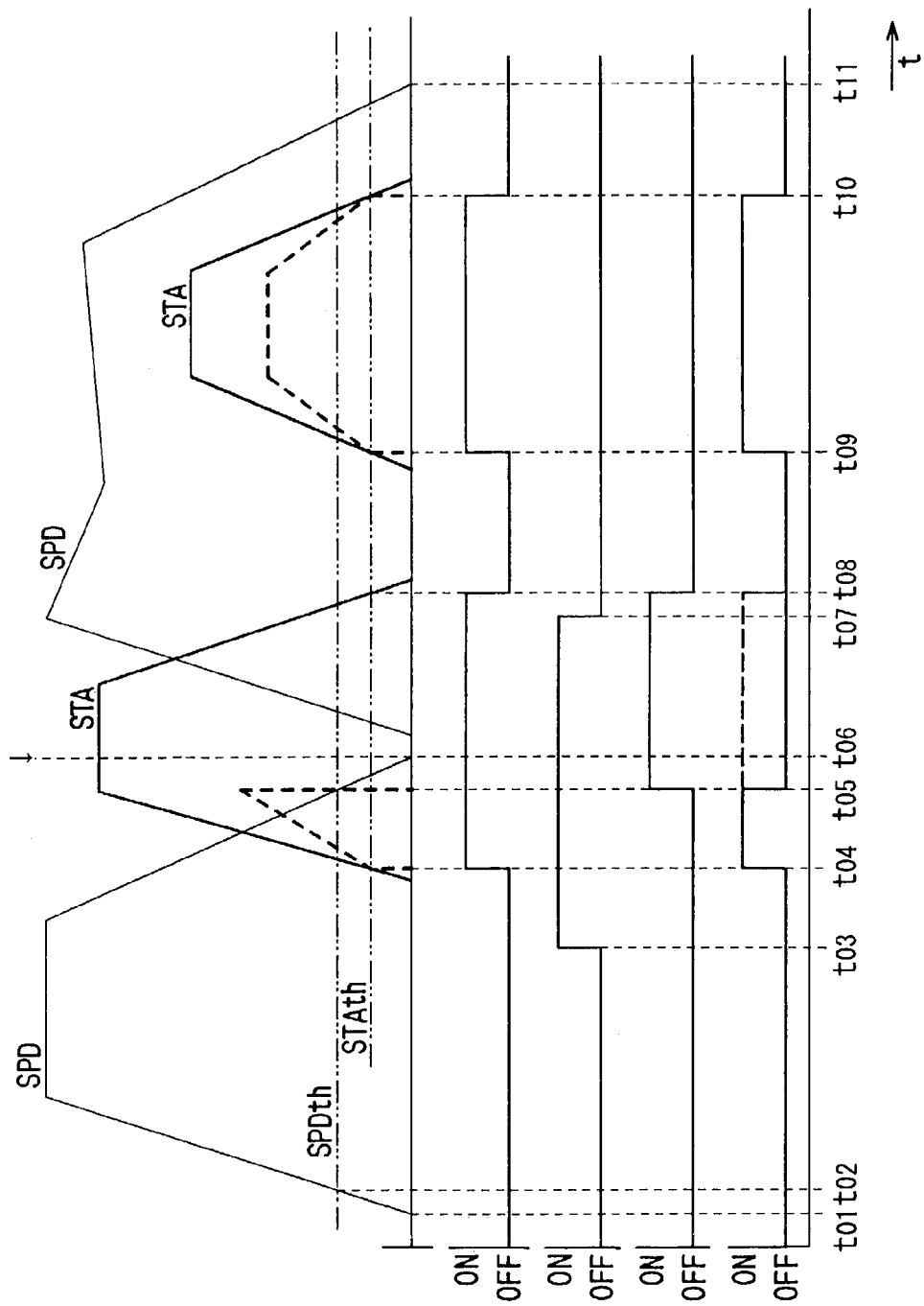

US 7,131,741 B2

AUTOMATIC BEAM-AXIS ADJUSTMENT SYSTEM FOR VEHICULAR HEADLIGHTS

CROSS REFERENCE TO RELATED APPLICATION

This application is based on and incorporates herein by reference Japanese Patent Application No. 2003-116055 filed on Apr. 21, 2003.

FIELD OF THE INVENTION

The present invention relates to an automatic beam-axis adjustment system for vehicular headlights.

BACKGROUND OF THE INVENTION

In a known automatic beam-axis adjustment system, a beam-axis of a vehicular headlight is horizontally swiveled according to a steering angle of a steering wheel. When a vehicle is at a stop or slowly moving in an intersection to turn, the beam-axis returns to an initial position, which is a straight-ahead position, regardless of the steering angle. The beam-axis is instantaneously swiveled to a position that is determined based on the steering angle. Such a movement of the headlight may disturb a driver.

SUMMARY OF THE INVENTION

The present invention therefore has an objective to provide an automatic beam-axis adjustment system that for adjusting a beam-axis of a headlight without disturbing a driver. In the beam-axis adjustment system of the present invention, the beam-axis of the headlight is adjusted using a swivel control procedure based on a vehicle speed and a steering angle of a steering wheel. Prior to the adjustment, it is determined whether an indication of a turn is provided based on signals from various sensors. If the indication is provided, the system uses an alternate swivel control procedure for gradually adjusting the beam-axis. As a result, the driver will not be disturbed by the movement of the headlight.

Furthermore, a higher-order smoothing is used when the vehicle speed is higher than a predetermined value and the headlight is swiveled to a position determined based on the steering angle. With the higher-order smoothing, the headlight is gradually swiveled. Therefore, the movement of the headlight does not disturb the drive.

BRIEF DESCRIPTION OF THE DRAWINGS

The above and other objectives, features and advantages of the present invention will become more apparent from the following detailed description made with reference to the accompanying drawings. In the drawings:

FIG. 10A is waveforms showing vehicle speeds, steering angles, and movements of the headlights responding to changes in the steering angles;

FIG. 10B is a waveform of a steering angle flag signal;

FIG. 10C is a waveform of an indicator signal;

FIG. 10D is a waveform of a turning determination signal;

FIG. 10E is a waveform of a swivel control flag signal.

DETAILED DESCRIPTION OF THE PREFERRED EMBODIMENT

Figure 1:
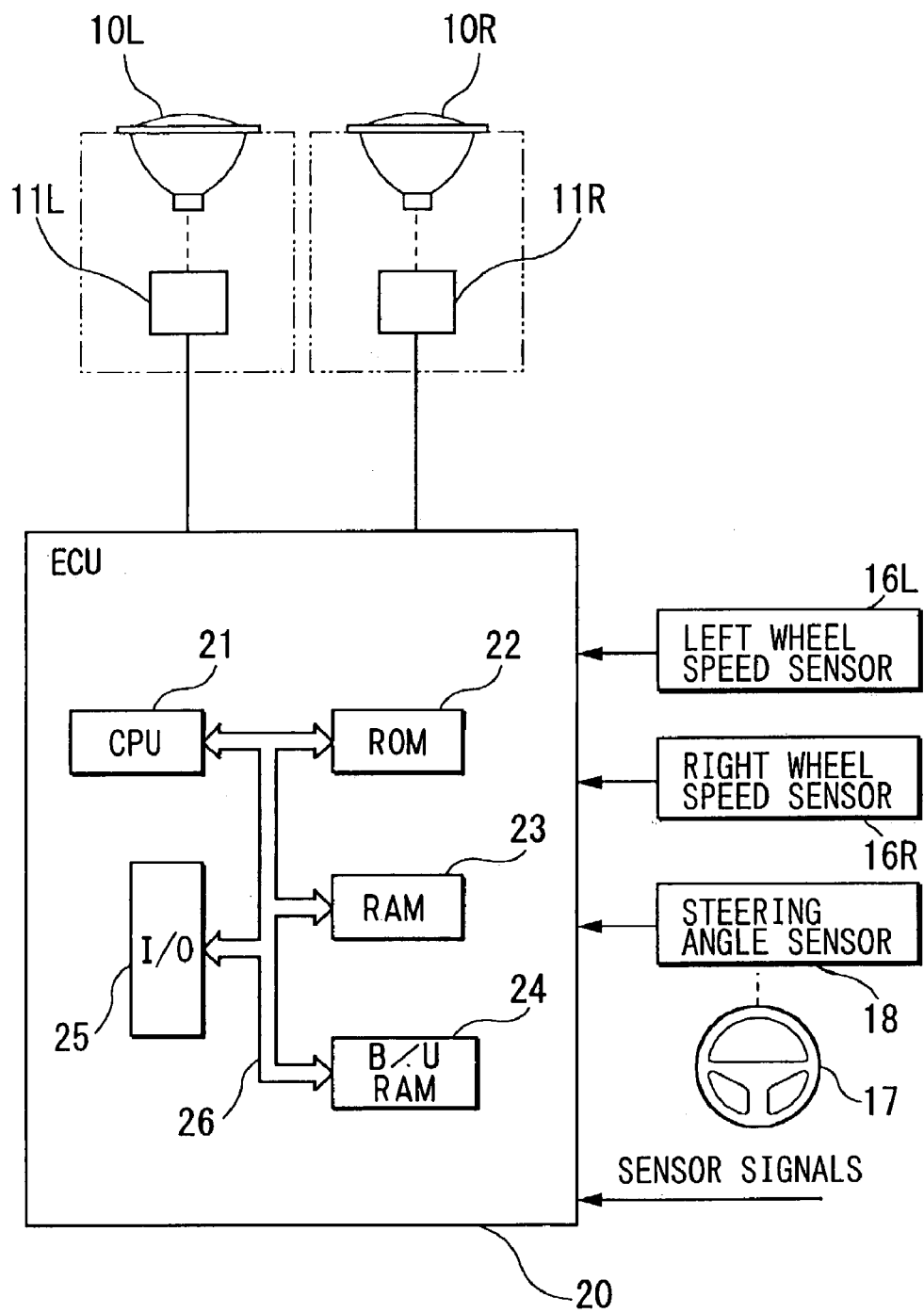
FIG. 1 is a block diagram of an automatic headlight beam-axis adjustment system for vehicular headlights according to embodiments of the present invention.

The preferred embodiments of the present invention will be explained with reference to the accompanying drawings. In the drawings, the same numerals are used for the same components and devices.

[First Embodiment]

Referring to FIG. 1, headlights 10L, 10R are installed on the front of a vehicle. Actuators 11L, 11R are connected to the headlights 10L, 10R for horizontally adjusting beam-axes of the headlights 10L, 10R. An electronic control unit (ECU) includes a CPU 21, a ROM 22, a RAM 23, a backup (U/B) RAM 24, an input/output (I/O) circuit 25, and a bus line 26. The CPU 21 performs various operating processes, the ROM 22 and the RAM 23 store control programs and data, respectively.

The ECU 20 receives signals from a left wheel speed sensor 16L, a right wheel speed sensor 16R, a steering angle sensor 18, and other sensors (not shown). The left wheel speed sensor 16L detects a left wheel speed VL, and the right wheel speed sensor 16R detects a right wheel speed VR. The steering angle sensor 18 detects a steering angle STA of the steering wheel 17. The ECU 20 outputs signals to the actuators 11L, 11R to adjust the beam-axes of the headlights 10L, 10R.

Figure 2:
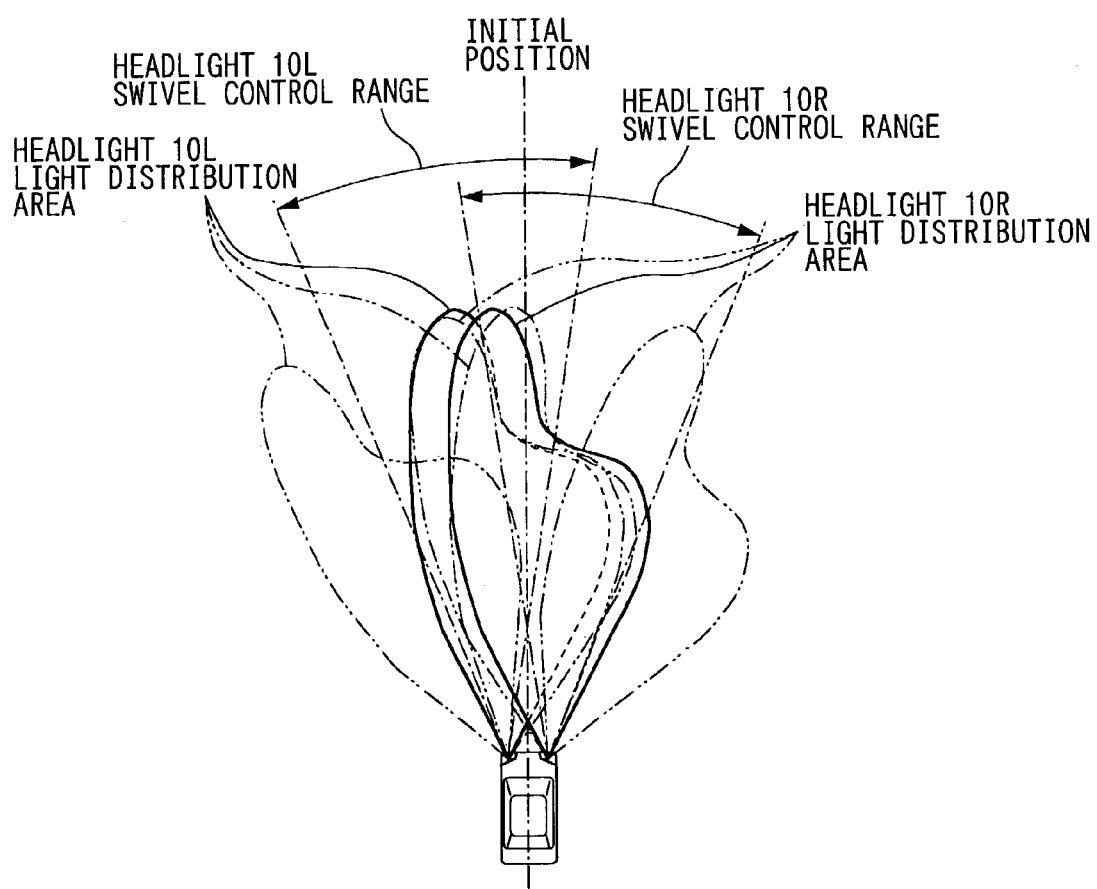
FIG. 2 is an explanatory diagram showing light distribution areas of the headlights and swivel control ranges.

Referring to FIG. 2, the headlights 10L, 10R are horizontally swiveled in the swivel control ranges based on the movement of the steering wheel 17. Light distribution areas (low beam) of the headlights 10L, 10R are adjusted by this swivel operation. The swivel control ranges are determined so that clear view to the front and sides is ensured when the vehicle turns. When the steering wheel 17 is turned clockwise, the swivel control range of the headlight 10R is larger than that of the headlight 10L. When the steering wheel 17 is turned counterclockwise, the swivel control range of the headlight 10L is larger than that of the headlight 10R.

A swivel control procedure performed by the CPU 21 will be explained referring to FIGS. 3 and 10. In FIG. 10, a vehicle speed SPD (km/h) and a steering angle STA (°) are indicated by fine solid lines and thick solid lines, respectively. The beam-axes of the headlights 10L, 10R that change directions in response to the steering angles STA are indicated by thick dashed lines. The swivel control process is repeated every predetermined period.

The CPU 21 receives various sensor signals (S101). The signals indicate the vehicle speed SPD, the steering angle STA, and an ON/OFF condition of an indicator signal. The vehicle speed SPD is calculated based on the left and the right wheel speeds VL, VR determined by the left and the right wheel speed sensors 16L, 16R, respectively. The steering angle STA is determined by the steering angle sensor 18. The ON/OFF condition of the indicator signal indicates an operating condition of an indicator (not shown).

In the next step, the first subroutine is called to execute a turning determination process (S102). After the first subroutine is completed, the second subroutine is called to calculate swivel angles of the headlights 10L, 10R (S103). Then, it is determined whether an indication of a turn is provided (S104). If the indication is not provided, a swivel control 1 is performed, which is a regular control procedure (S105), and the procedure is completed. The results of the swivel control 1 are shown in FIG. 10A between time t09 and time t10.

If the indication is provided, a swivel control 2, or alternate procedure, is performed (S106), and the procedure is completed. The results of the swivel control 2 are shown in FIG. 10A between time t04 and time t05. In other words, the CPU 21 performs the swivel control 2, or alternate procedure, rather than the swivel control 1 when the indication of a turn is provided. Therefore, the headlights 10L, 10R are smoothly swiveled and the movement of the headlights 10L, 10R does not disturb a driver.

[Second Embodiment]

Figure 3:
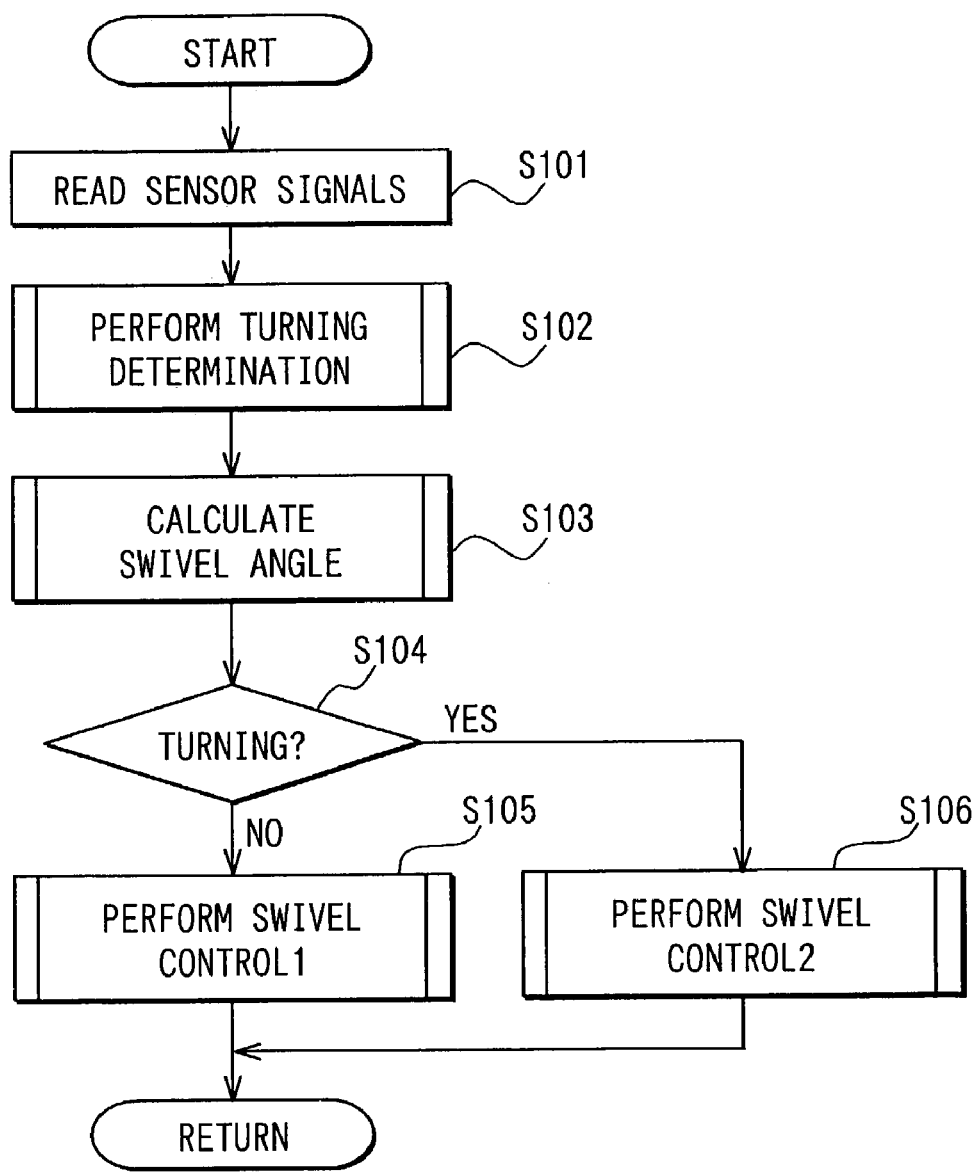
FIG. 3 is a flowchart showing a swivel control procedure performed by a CPU included in the adjustment system according to the first embodiment of the present invention.
Figure 4:
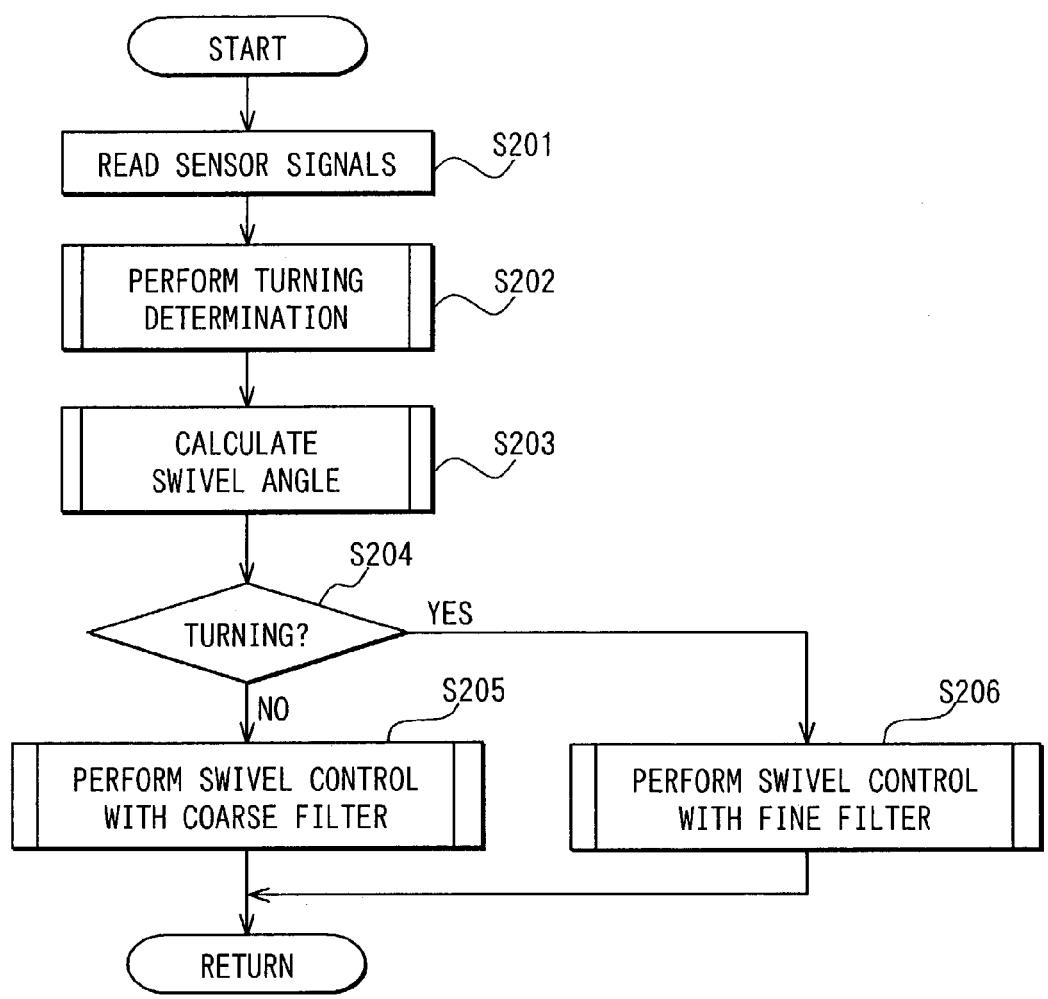
FIG. 4 is a flowchart showing a swivel control procedure according to the second embodiment.

Referring to FIG. 4, steps S201 to S204 are performed in the same manner as steps S101 to S104 in FIG. 3. When an indication of a turn is not provided (S204), a swivel control that uses a lower-order smoothing is performed (S205) and the procedure is completed. If the indication of a turn is provided (S204), the other swivel control,or alternate procedure, which uses a higher-order smoothing, is performed (S206) and the procedure is completed.

A new swivel angle is calculated by the following (S203):

Swivel angle=a×f(SPD, STA)+(1−a)×(old swivel angle), where a=0.30 for the lower-order smoothing a=0.02 for the higher-order smoothing.

The swivel control is performed by a swivel control circuit that includes the actuators 11L, 11R, and the ECU 20. The circuit switches the filter from the lower-order smoothing to the higher-order smoothing when the indication of a turn is provided. When the vehicle speed is higher than the predetermined value SPDth, the headlights 10L, 10R are gradually swiveled to the position determined based on the steering angle STA. Therefore, the movement of the headlights 10L, 10R does not disturb the driver. This swivel control procedure is repeated by the CPU 21 every predetermined period.

[Third Embodiment]

Figure 5:
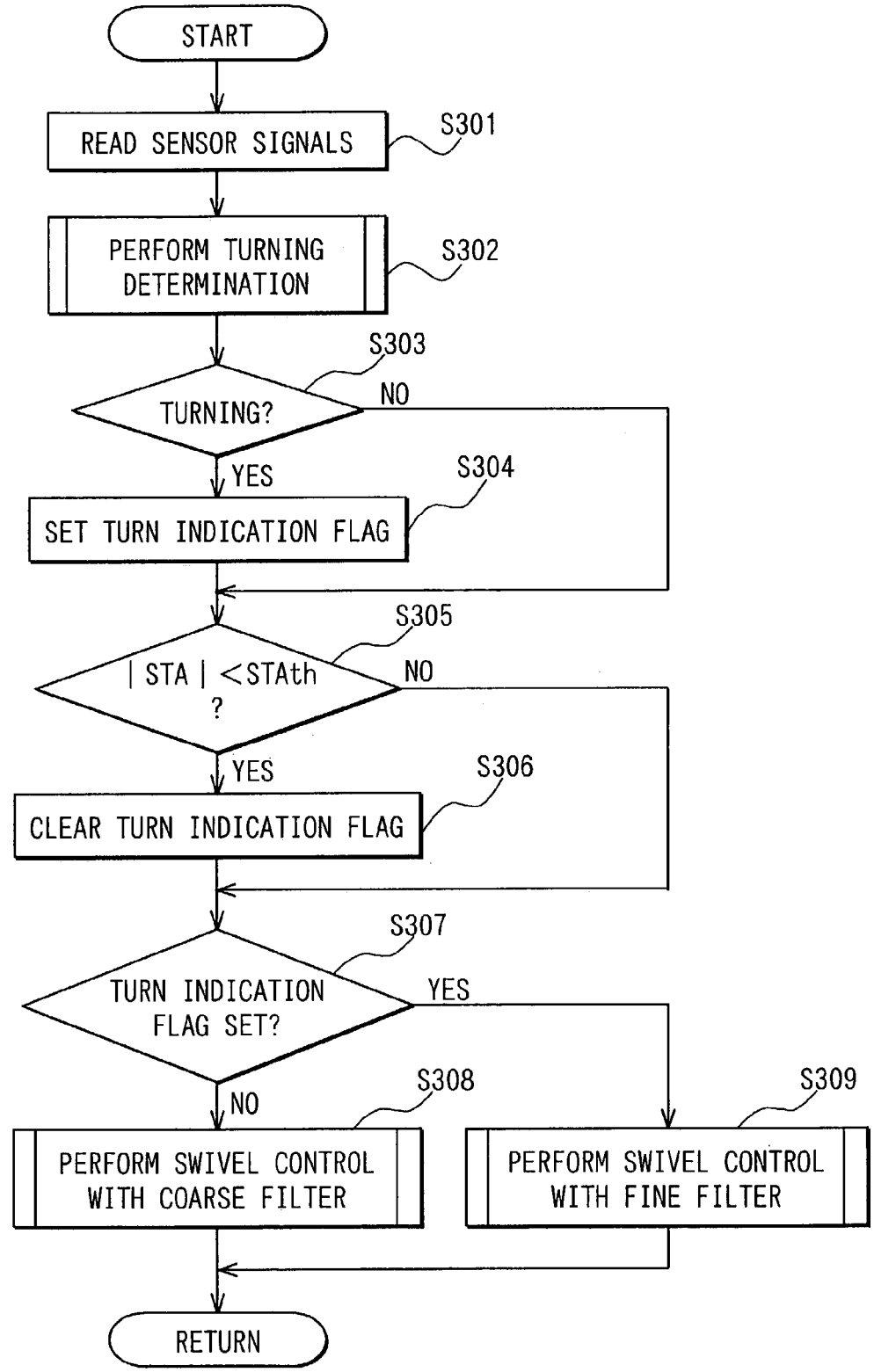
FIG. 5 is a flowchart showing a swivel control procedure according to the third embodiment.

Referring to FIG. 5, signals from the sensors are read in the first step (S301). Then, the first subroutine is called to execute a turning determination process in the next step (S302). When the first subroutine is completed, it is determined whether an indication of a turn is provided (S303). If the indication is provided, a turn indication flag is set (S304). This is a condition shown in FIG. 10D between time t05 to time t08. If the indication is not provided, the flag is not set.

In the next step (S305), it is determined whether an absolute value of the steering angle STA is smaller than the predetermined value STAth. If so, the indication flag is cleared (S306). This is a condition shown in FIG. 10D before time t05 or after time t08. If the absolute value is larger than the predetermined value STAth (t04 to t08, t09 to t10 in FIG. 10B), the flag is not cleared. Then, it is determined whether the indication flag is set (S307). If not, a swivel control process using a lower-order smoothing is performed (S308) and the procedure is completed. If the indication flag is set, a swivel control process using a higher-order smoothing is performed (S309) and the procedure is completed.

The swivel control is performed by a swivel control circuit that includes the actuators 11L, 11R, and the ECU 20. The circuit switches the filter from the higher-order smoothing to the lower-order smoothing when the steering angle STA is smaller than the predetermined value STAth. In other words, the regular filter is used when the steering wheel 17 is turned close to the initial position. The filter is switched back to the lower-order smoothing after the turn of the vehicle is nearly completed. Therefore, the movement of the headlights 10L, 10R does not disturb the driver. This swivel control procedure is repeated by the CPU 21 every predetermined period.

[Fourth Embodiment]

Figure 6:
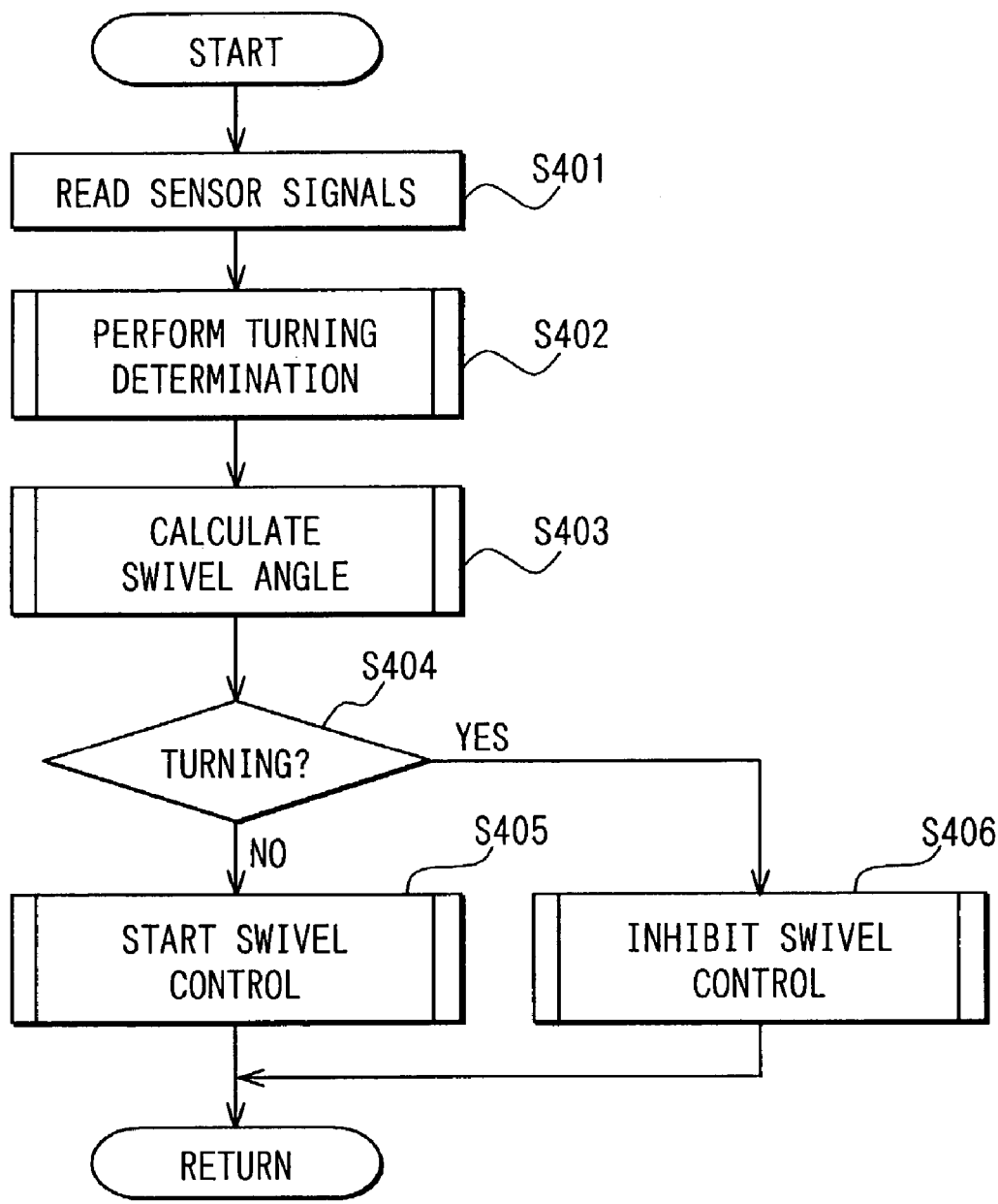
FIG. 6 is a flowchart showing a swivel control procedure according to the fourth embodiment.

Referring to FIG. 6, steps S401 to S404 are performed in the same manner as the steps S101 to S104 in FIG. 3. If an indication of a turn is not provided, a regular swivel control is performed (S405) and the procedure is completed. The results of this swivel control are shown in FIG. 10A between time t09 and time t10. If the indication of a turn is provided, the swivel control is inhibited (S406) and the procedure is completed.

Referring to FIG. 10E, a swivel control flag for activating a swivel control is set between time t04 and time t08 during normal operations as indicated with horizontal dashed lines. However, the flag is cleared between time t05 and time t08 because the indication of a turn is provided.

The swivel control is performed by a swivel control circuit that includes the actuators 11L, 11R, and the ECU 20. The circuit inhibits the swivel control when the indication of a turn is provided. The swivel control is inhibited even when the vehicle speed is higher than the predetermined value SPDth and an instruction to adjust the headlights 10L, 10R based on the steering angle STA is issued. Therefore, the movement of the headlights 10L, 10R does not disturb the driver. This swivel control procedure is repeated by the CPU 21 every predetermined period.

[Fifth Embodiment]

Figure 7:
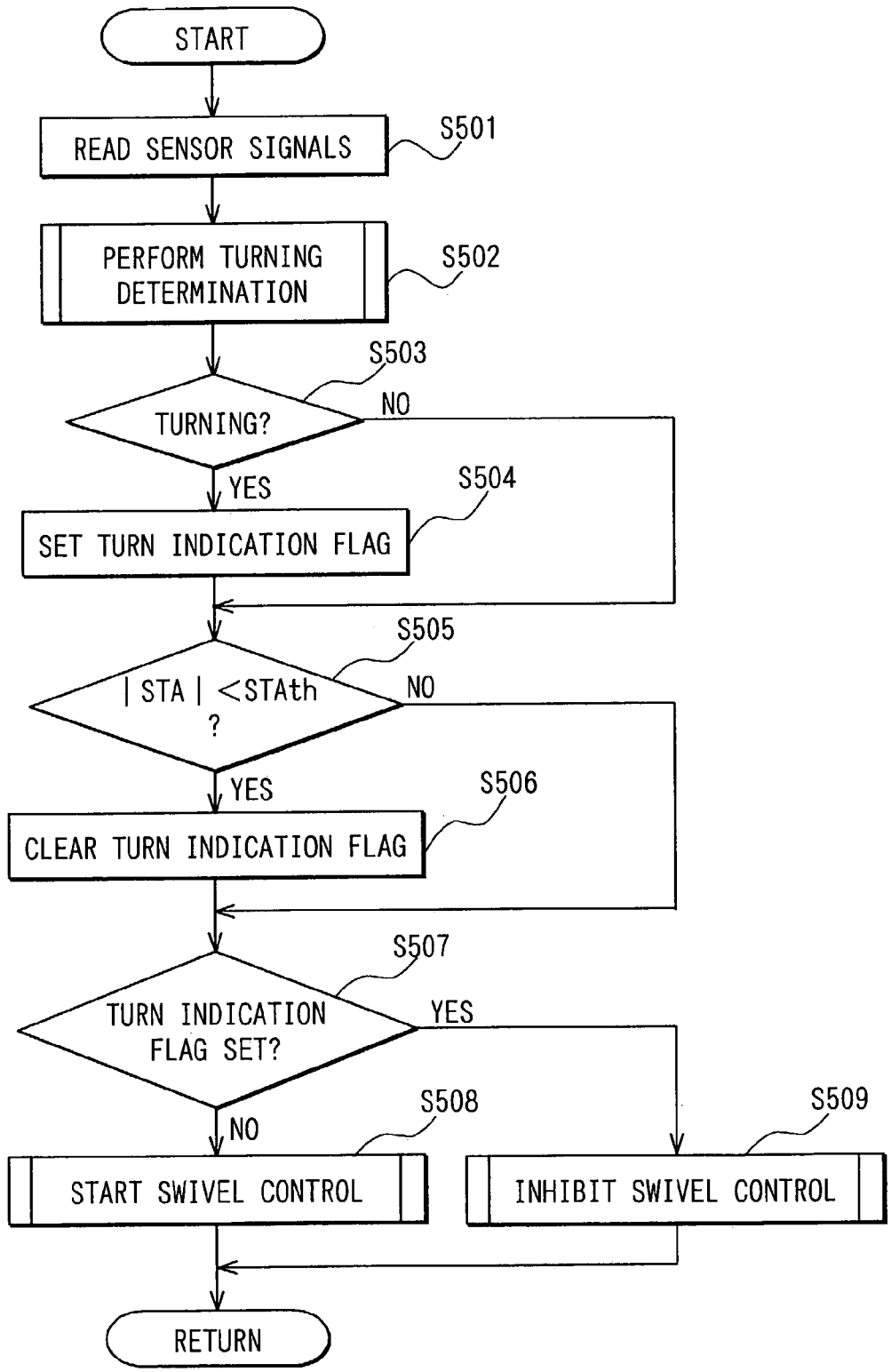
FIG. 7 is a flowchart showing a swivel control procedure according to the fifth embodiment.

Referring to FIG. 7, steps S501 to S507 are performed in the same manner as the steps S301 to S207 in FIG. 5. If an indication of a turn is not provided, the regular swivel control is performed (S508) and the procedure is completed. If the indication of a turn is provided, the regular swivel control is inhibited (S509) and the procedure is completed.

Referring to FIG. 10E, a swivel control flag for activating a swivel control is set between time t04 and time t08 during normal operations as indicated with horizontal dashed lines. However, the flag is cleared between time t05 and time t08 because the indication of a turn is provided.

The swivel control is performed by a swivel control circuit that includes the actuators 11L, 11R, and the ECU 20. The circuit restarts the swivel control when the steering angle STA is smaller than the predetermined value STAth. The regular swivel control is restarted for adjusting the headlights 10L, 10R from the initial position to a position determined by the steering angle STA. Therefore, the movement of the headlights 10L, 10R does not disturb the driver. This swivel control procedure is repeated by the CPU 21 every predetermined period.

Figure 8:
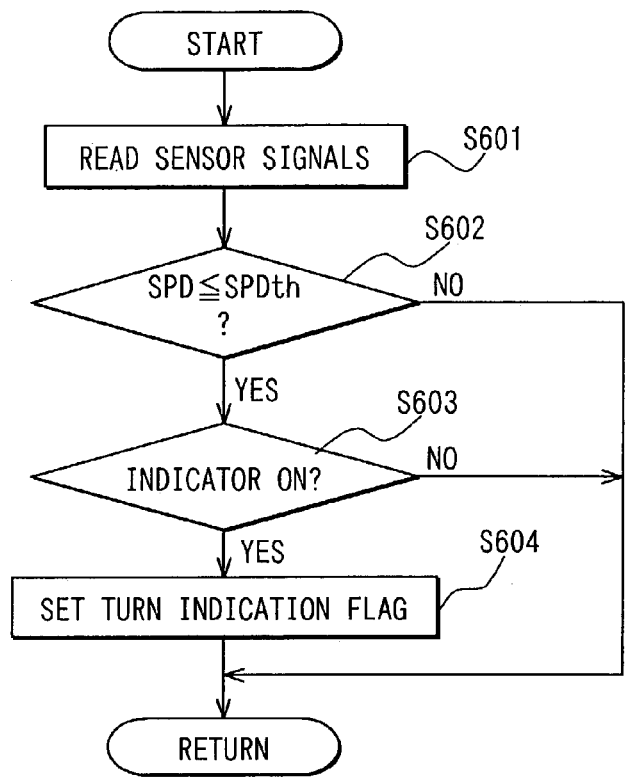
FIG. 8 is a flowchart showing a subroutine program of the swivel control procedure for executing a turning determination procedure according to the first to the fifth embodiments.

The subroutine for turning determination will be explained in detail referring to FIG. 8. This subroutine is repeated every predetermined period by the CPU 21. Signals from the sensors are read (S601) and it is determined whether the vehicle speed SPD is lower than the predetermined value SPDth based on the signals (S602).

If the speed is lower than the predetermined value SPDth, it is determined whether the indicator is turned on (S603). If the indicator is turned on (t03 to t07 in FIG. 10C), the turn indication flag is set (S604) and this subroutine is completed. This condition is shown in FIG. 10D between time t05 and time t08. If the speed is higher than the predetermined value SPDth or the indicator is turned off (before t03 and after t07 in FIG. 10C), the flag is not set and the subroutine is completed.

The other swivel control is used when the vehicle speed SPD is lower than the predetermined value SPDth, the indicator is turned on, and the indication of a turn is provided. The alternate swivel control is set so that the headlights 10L, 10R swivels according to the steering angle. Therefore, the movement of the headlights 10L, 10R does not disturb the driver.

Figure 9:
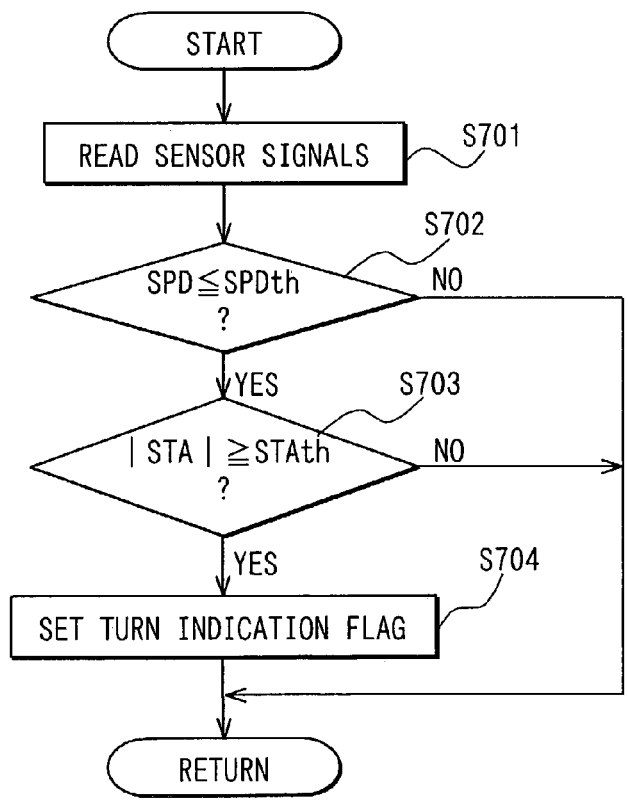
FIG. 9 is a flowchart showing a flowchart showing a modified subroutine program of the swivel control procedure shown in FIG. 8.

Another subroutine for turning determination will be explained in detail referring to FIG. 9. Signals from the sensors are read (S701) and it is determined whether the vehicle speed SPD is lower than the predetermined value SPDth based on the signals (S702). If the speed is lower than the predetermined value SPDth, it is determined whether the absolute value of the steering angle is larger than the predetermined value STAth (S703). If the steering angle is larger than the value STAth (between t04 and t08, between t09 and t10 in FIG. 10B), the turn indication flag is set (S704) and this subroutine is completed. The condition that the turn indication flag is set is shown in FIG. 10D between t05 and t08.

If the speed is higher than the predetermined value SPDth or the absolute value of the steering angle STA is smaller than the value STAth, the flag is not set and this subroutine is completed.

The alternate swivel control is used when the vehicle speed SPD is lower than the value SPDth and the absolute value of the steering angle STA is larger than the value STAth. The alternate swivel control is set so that the headlights 10L, 10R swivels according to the steering angle. Therefore, the movement of the headlights 10L, 10R does not disturb the driver.

The present invention should not be limited to the embodiment previously discussed and shown in the figures, but may be implemented in various ways without departing from the spirit of the invention. For example, the swivel control may be restarted after the vehicle travels straight ahead for a while. More specifically, the swivel control may be restarted when the steering angle STA becomes substantially zero degree, that is, less than ±5 (°) including play of the steering wheel 17. The swivel control is inhibited when the speed SPD is lower than the value SPDth. Then, the swivel control is restarted when the speed SPD is higher than the value SPDth and the steering angle remains less than the value STAth for the predetermined period.

When the indication of a turn is provided and the steering angle STA is larger than the value STAth, the headlights 10L, 10R may be temporarily in a non-swivel control range. The non-swivel control range is a range that the swivel control is not performed even when the steering angle STA is larger than the value STAth if the speed SPD is lower than the value SPDth. The swivel control range is a range that the swivel control is performed when the speed SPD is higher than the value STAth and the steering angle STA is larger than the value STAth, as shown in FIG. 2. The headlights 10L, 10R are back into a swivel control range when the speed SPD is higher than the value SPDth and the angle STA remains substantially zero degree for the predetermined period. Therefore, the movement of the headlights 10L, 10R does not disturb the driver.

The indication of a turn can be provided by an onboard car navigation system, which provides information on intersections. In such a case, the swivel control procedure can be switched based on a distance between the current position of the vehicle and the intersection.

The present invention is not limited to headlights of a vehicle. The adjustment system may be applied to other lights. Furthermore, the beam-axes may be diagonally adjusted from side to side. The beam-axes may be gradually adjusted to a position determined based on the absolute value of the steering angle STA if the beam-axes is returned to the initial position. Then, the swivel control is restarted.

What is claimed is:

1. An automatic beam-axis adjustment system for a vehicular headlight, comprising:
   a speed determination means for determining a vehicle speed;
   a steering angle determination means for determining a steering angle of a steering wheel of the vehicle;
   a swivel control means for horizontally adjusting a beam-axis of the vehicular headlight, wherein the swivel control means employs a regular control procedure for adjusting the beam-axis based on the vehicle speed and the steering angle determined by the speed determination means and the steering angle determination means, respectively; and
   a signal detecting means for detecting different kinds of signals related to a turning condition of the vehicle, wherein the swivel control means uses an alternate procedure to adjust the beam-axis in which the beam-axis returns to an initial position when the vehicle speed is lower than a specific value and an indication of a turn is provided.

2. The automatic beam-axis adjustment system according to claim 1, wherein the swivel control means uses a strong filter when the indication of a turn is provided.

3. The automatic beam-axis adjustment system according to claim 2, wherein the swivel control means stops using the strong filter when the steering angle becomes within a predetermined range.

4. The automatic beam-axis adjustment system according to claim 1, wherein the swivel control means inhibits the swivel control procedure when the indication of a turn is provided.

5. The automatic beam-axis adjustment system according to claim 4, wherein the swivel control means restarts the swivel control procedure when the steering angle becomes within the predetermined range.

6. The automatic beam-axis adjusting system according to claim 1, wherein:
   the swivel control means inhibits the swivel control procedure when the vehicle speed is lower than a predetermined value; and
   the swivel control means restarts the swivel control procedure when the vehicle speed is higher than the predetermined value and the steering angle remains within the predetermined range for a predetermined period.

7. The automatic beam-axis adjusting system according to claim 1, wherein:

the sensor signals are related to the vehicle speed and an indicator; and the swivel control means uses the different procedure for adjusting the beam-axis when the vehicle speed is lower than the predetermined value and the sensor signal according to the indicator indicates a turn.

8. The automatic beam-axis adjusting system according to claim 1, wherein:

the sensor signals indicate the vehicle speed and the steering angle; and the swivel control means uses the different procedure when the vehicle speed is lower than the predetermined value and the steering angle is out of the predetermined range.

9. The automatic beam-axis adjusting system according to claim 1, wherein the automatic beam-axis adjusting system is installed in a vehicle, and the initial position is a position in which the beam-axis of the vehicular headlight is aligned with a longitudinal axis of the vehicle such that the headlight is pointed straight ahead of the vehicle.

10. An automatic beam-axis adjustment system for a vehicular headlight, comprising:

a speed determination means for determining a vehicle speed;

a signal detecting means for detecting different kinds of signals related to a turning condition of the vehicle;

a steering angle determination means for determining a steering angle of a steering wheel of the vehicle; and a swivel control means for horizontally adjusting a beam-axis of the vehicular headlight, wherein the swivel control means employs a regular control procedure for adjusting the beam-axis at a first speed based on the vehicle speed and the steering angle determined by the speed determination means and the steering angle determination means, respectively, and the swivel control means uses an alternate procedure to adjust the beam-axis in which the beam-axis is swiveled at a second speed, which is slower than the first speed, based on the vehicle speed and the steering angle when the vehicle speed is lower than a specific value and an indication of a turn is provided.

* * * * *